US008615735B2

United States Patent
McLachlan et al.

(10) Patent No.: US 8,615,735 B2
(45) Date of Patent: Dec. 24, 2013

(54) SYSTEM AND METHOD FOR BLURRING INSTRUCTIONS AND DATA VIA BINARY OBFUSCATION

(75) Inventors: Jon McLachlan, San Francisco, CA (US); Ganna Zaks, Mountain View, CA (US); Julien Lerouge, Santa Clara, CA (US); Pierre Betouin, Boulogne (FR); Augustin J. Farrugia, Cupertino, CA (US); Gideon M. Myles, San Jose, CA (US); Cédric Tessier, Paris (FR)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 13/100,041

(22) Filed: May 3, 2011

(65) Prior Publication Data

US 2012/0284688 A1  Nov. 8, 2012

(51) Int. Cl.
*G06F 9/44* (2006.01)

(52) U.S. Cl.
USPC ........... 717/110; 717/111; 717/112; 717/143; 717/146

(58) Field of Classification Search
USPC .................. 717/110, 111, 112, 141, 143, 146
See application file for complete search history.

(56) References Cited

U.S. PATENT DOCUMENTS

| | | | |
|---|---|---|---|
| 6,978,358 B2 * | 12/2005 | Francis | 712/202 |
| 7,120,572 B1 * | 10/2006 | Liang | 703/26 |
| 7,383,443 B2 | 6/2008 | Zeman et al. | |
| 7,512,985 B1 | 3/2009 | Grabarnik et al. | |
| 7,823,135 B2 | 10/2010 | Horning et al. | |
| 2004/0003264 A1 * | 1/2004 | Zeman et al. | 713/190 |
| 2005/0183072 A1 | 8/2005 | Horning et al. | |
| 2007/0067606 A1 * | 3/2007 | Lin et al. | 712/10 |

(Continued)

FOREIGN PATENT DOCUMENTS

WO   2008/094808   8/2008

OTHER PUBLICATIONS

C-Jump, "http://www.c-jump.com/CIS77/samples/add_16_bytes.1st", on Aug. 19, 2008. Microsoft (R) Macro Assembler Version 8.00.50727.762  ..\Source\p01_smallest\add_16_bytes.asm  p. 1-1.*

(Continued)

*Primary Examiner* — Chat Do
*Assistant Examiner* — Jae Jeon
(74) *Attorney, Agent, or Firm* — Novak Druce Connolly Bove + Quigg LLP

(57) ABSTRACT

Disclosed herein are systems, methods, and non-transitory computer-readable storage media for obfuscating a computer program. A system configured to practice the method identifies a set of executable instructions at a first location in an instruction section of the computer program and identifies a second location in a data section of the computer program. Then the system moves the set of executable instructions to the second location and patches references in the computer program to the set of executable instructions to point to the second location. The instruction section of the computer program can be labeled as _TEXT,_text and the data section of the computer program is labeled as _DATA,_data. The set of executable instructions can include one or more non-branching instructions optionally followed by a branching instruction. The placement of the first and second locations can be based on features of a target computing architecture, such as cache size.

20 Claims, 9 Drawing Sheets

(56) References Cited

U.S. PATENT DOCUMENTS

| | | | |
|---|---|---|---|
| 2007/0234070 A1* | 10/2007 | Horning et al. | 713/190 |
| 2008/0028474 A1* | 1/2008 | Horne et al. | 726/27 |
| 2010/0115287 A1 | 5/2010 | Betouin et al. | |
| 2011/0035733 A1 | 2/2011 | Horning et al. | |

OTHER PUBLICATIONS

"PCT International Search Report dated Jul. 25, 2012", PCT Application No. PCT/US2012/034716, Jul. 25, 2012, 4 pages.

"PCT International Written Opinion dated Jul. 25, 2012", PCT Application.No. PCT/US2012/034716, Jul. 25, 2012, 8 pages.

* cited by examiner

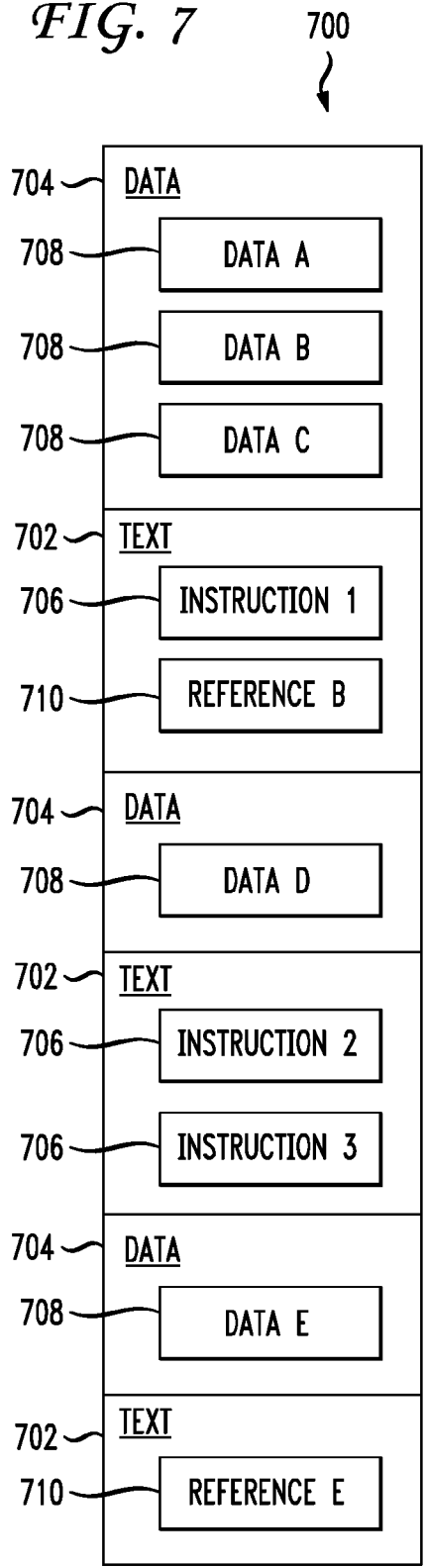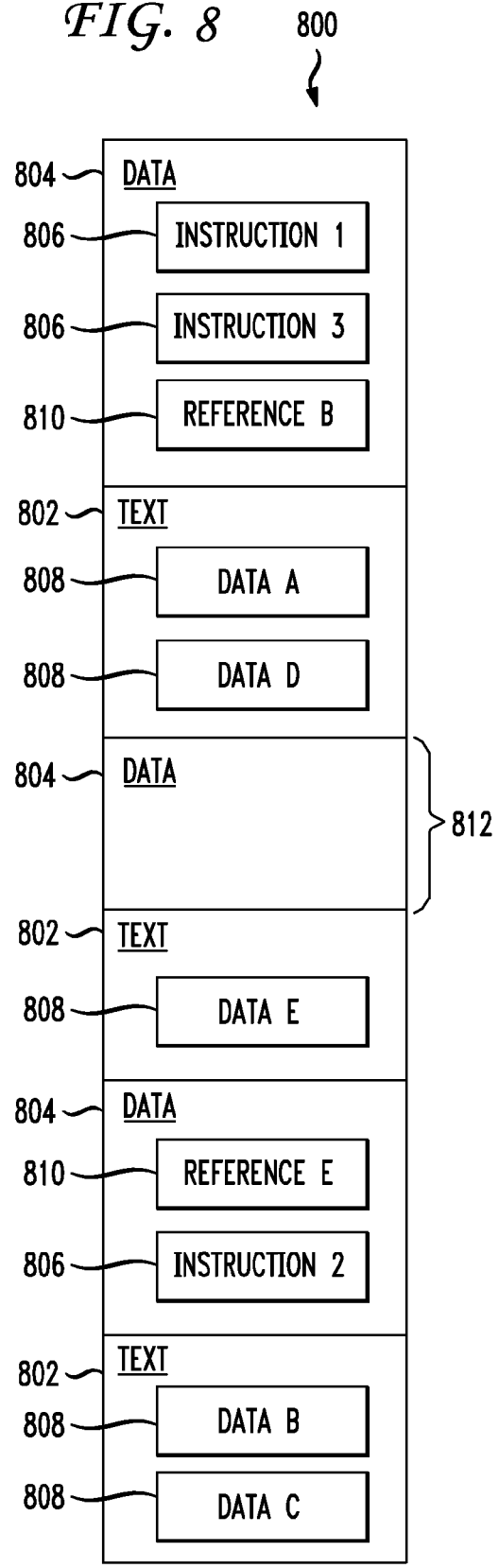

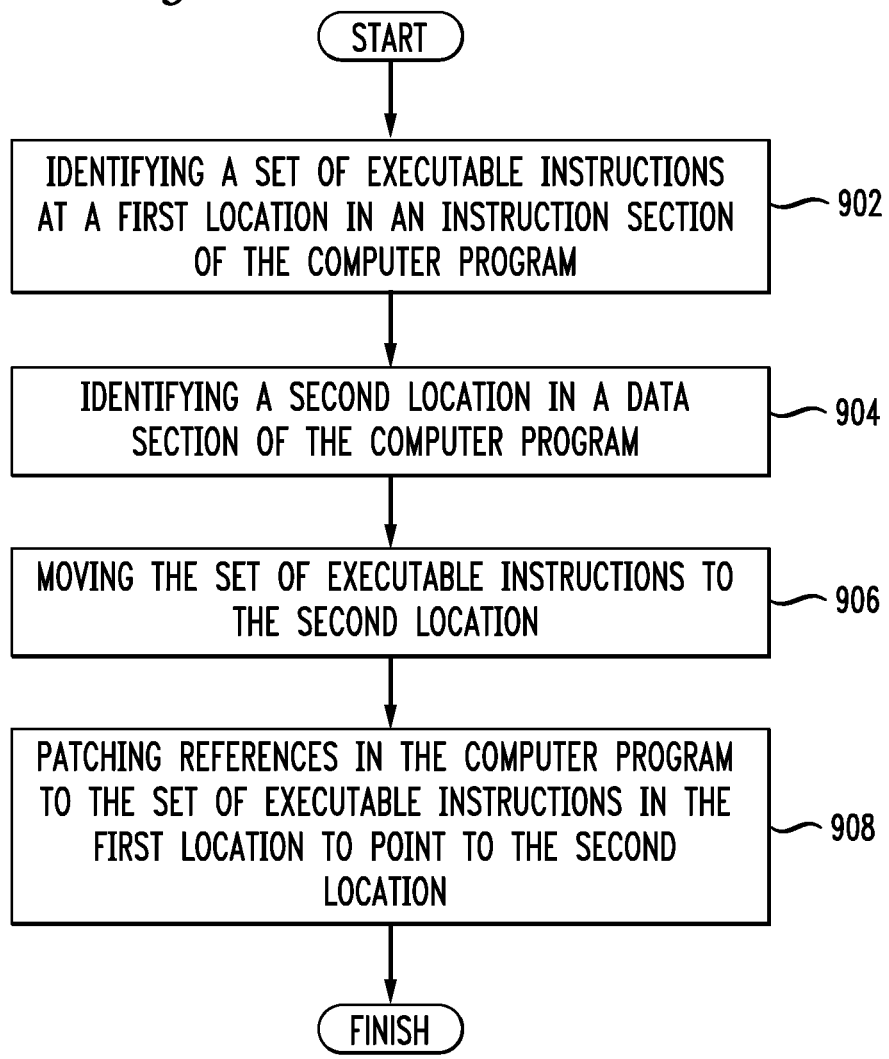

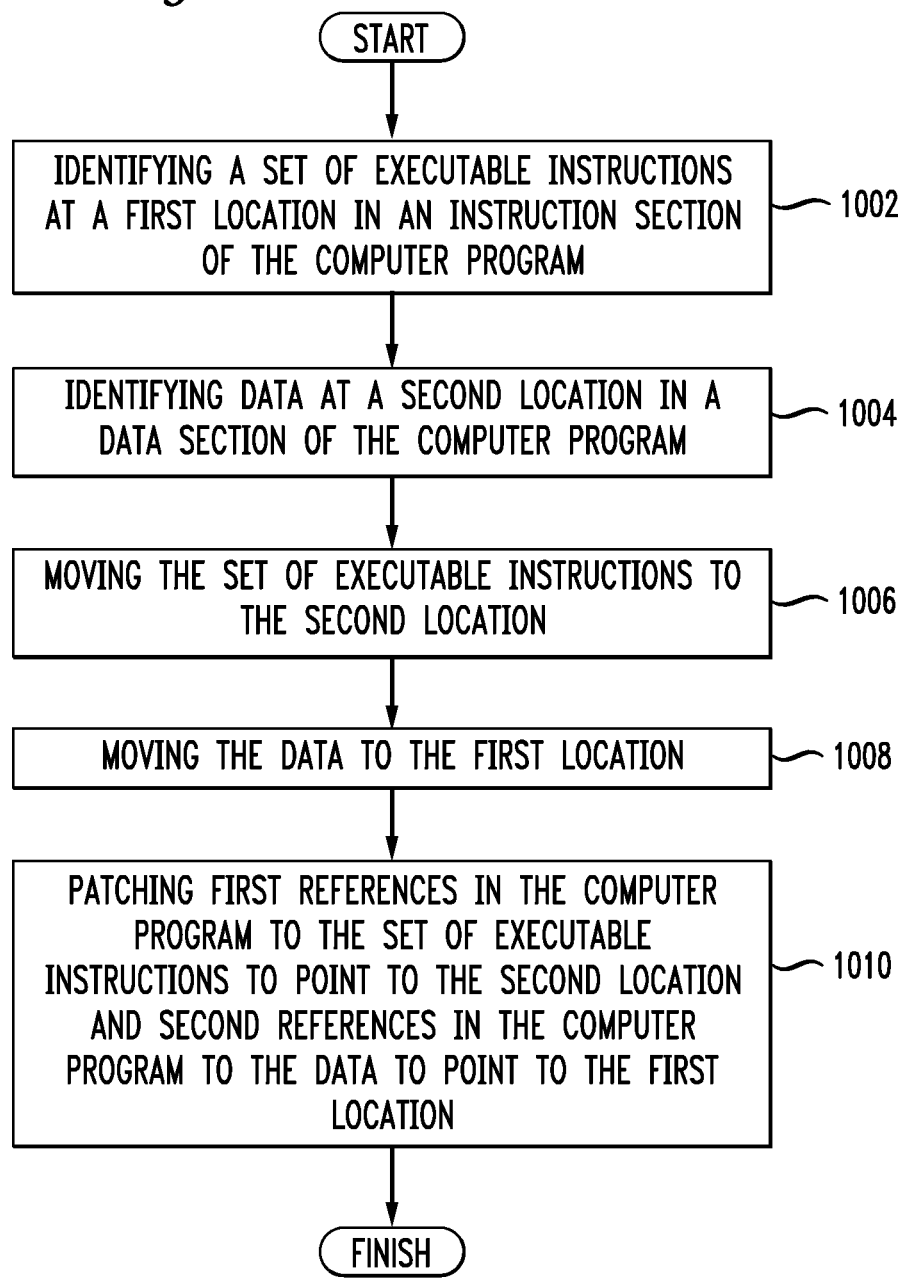

SYSTEM AND METHOD FOR BLURRING INSTRUCTIONS AND DATA VIA BINARY OBFUSCATION

BACKGROUND

1. Technical Field

The present disclosure relates to obfuscating a computer program, and more specifically to obfuscating data and instruction segments of a computer program.

2. Introduction

When compiling a computer program, a standard compiler will place the data and instructions for that computer program into distinct blocks. Because these blocks are logically organized, the computer can execute the instructions by running line after line of commands from the instruction blocks and retrieving necessary data from neatly organized data blocks. Unfortunately, these neatly organized and predictably laid out blocks of instructions and data are exploited by reverse engineers.

Attempts to reverse engineer a software program typically rely on one or both of two primary techniques: static analysis and dynamic analysis. Some static techniques identify specific sections of code and perform a linear sweep of the code section, line upon line, to disassemble the code from machine code to assembler. Static analysis can be quite effective at reverse engineering programs, but rely upon specific assumptions about the compiled code to correctly perform the reverse engineering. When these assumptions fail, reverse engineers are then forced to employ dynamic analysis, observing the inputs and outputs of the program and drawing inferences about the underlying code to either attempt to build an equivalent piece of code or understand and/or modify the functions of the code.

By using static and dynamic techniques to reverse engineer software programs, reverse engineers can develop software to mimic or replace previously developed software. In some cases, this new software fails to completely emulate the original software, while in other cases, attackers insert malicious code or functionality in reverse engineered software. For these and other reasons, software developers wish to protect their code by preventing unauthorized duplication, modification, or other attacks on their software.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for obfuscating the data and instructions of a software program. A system can include one or more of a processor, system, computer, computing device, etc., configured to practice the method. The system can obfuscate the machine code during compilation, shortly after compilation, or can obfuscate the machine code when being loaded into system memory.

The disclosed approaches for obfuscation can include placing instructions, and sets of instructions, in blocks otherwise specified as 'data blocks.' Similarly, the obfuscation approach can include placing data within instruction blocks. In some circumstances, data and instructions may be swapped, and there may be some size adjustment if the data size does not match the instruction size.

The disclosed obfuscation approaches can include moving multiple instructions and multiple pieces of data from their traditional locations, such as text or data sections, and placing the instructions and/or data in locations other than a designated or labeled region of a file, storage, or memory. One result of moving multiple sets of instructions and multiple pieces of data is an updated network of links and references to the new locations of the data and/or instructions. Another possible result is blocks of data or instructions which, in fact, contain no data or instructions, or possibly no relevant data or instructions.

A system, such as a compiler, configured to practice the exemplary method of obfuscating a computer program first identifies a set of executable instructions at a first location in an instruction section of the computer program. Then the system identifies a second location in a data section of the computer program. The system can then move the set of executable instructions to the second location and patch references in the computer program to the set of executable instructions in the first location to point to the second location. The patched computer program is obfuscated and retains the same overall functionality as the unobfuscated computer program, but as the program executes, some instructions are read from new/different locations. This approach can be used to produce multiple differently obfuscated versions, which are functionally identical, even though their exact execution paths differ. For example, the selection of which locations to obfuscate and where to move those locations can be selected randomly. In this way, a software distributor can ship multiple functionally compatible versions of the same executable file, but a successful reverse engineering or other attack on one version of the executable file is not transferable to another version of the executable file.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates multiple exemplary data and instruction blocks before obfuscation;

FIG. 8 illustrates the multiple exemplary data and instruction blocks of FIG. 7 after obfuscation;

FIG. 9 illustrates a first example method embodiment; and

FIG. 10 illustrates a second example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for data and instruction obfuscation in software programs. A system, method and non-transitory computer-readable media are disclosed which obfuscate data and instructions of software programs by altering, obfuscating, or scrambling locations of the data and instructions and references to those locations. A brief introductory description of a basic general purpose system or computing device in FIG. 1 which can be employed to practice the concepts is disclosed herein. A more detailed description of the obfuscation approaches will then follow. These variations shall be discussed herein as the various embodiments are set forth. The disclosure now turns to FIG. 1.

Figure 1:
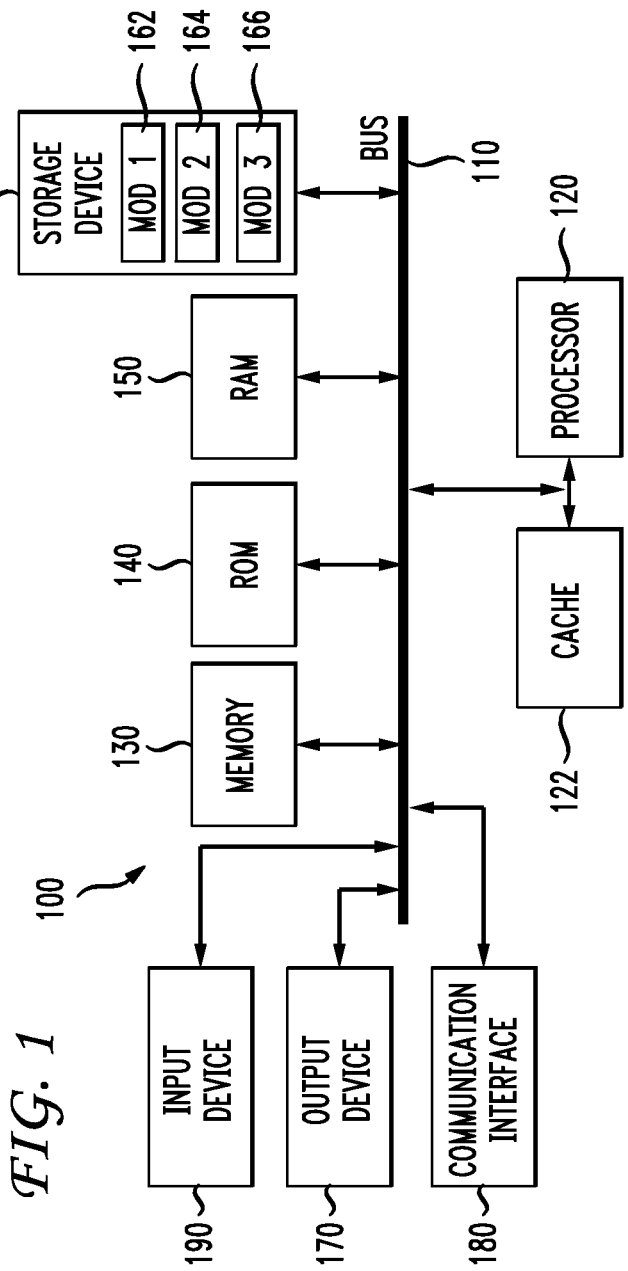
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular instruction includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a basic computing system, the disclosure turns now to a discussion of computer program layout and obfuscation of that layout. A computer program generally relies on a stack of data and functions in a stack frame for execution. A compiler organizes data into blocks that contain variables, arguments, CPU register contents, and/or other information for the program. These blocks, often called segments or sections, can be designated with a label, such as "_DATA,_data" or can simply allocate space for specific data structures. Instructions are generally similarly organized into blocks which can be designated with a label, such as "_TEXT,_text" or can simply contain instructions for the processor on what commands to execute. These blocks can be designated with other labels or with no label.

This arrangement of data and instruction blocks allows for easier readability for both a reverse engineer and the processor. By analyzing the machine code produced by the compiler an attacker can determine where the instruction and data blocks begin and end, and use disassembling technology or other tools to understand how the code works, or even revert the machine code to human readable code. The most direct technique for doing this often is static analysis, relying upon a traversal of the code either linearly or recursively. When static analysis is either not available or not effective, attackers are forced to rely upon dynamic analysis, which requires the execution of the instructions to be observed in real time, rather than statically analyzed. Whereas with static techniques an attacker can essentially replicate all or most of a program from extracted code, with dynamic techniques must reconstruct the program based on inferences and observations.

Obfuscation can be a useful tool to disrupt static reverse engineering techniques and force a reverse engineer to utilize dynamic techniques to build a comparable program or modify the existing program. The disclosed system obfuscates program information such that a reverse engineer must use dynamic techniques, rather than static techniques, in attempting to reverse engineer the software. In one aspect, the system identifies a set of instructions within an instruction block. The set of instructions can be one or more lines of code, an entire function, a group of instructions ending in a jump command, or other segment of the code. The system can then move the identified set of instructions out of the designated instruction block and into a designated data block, after which the system can patch in the removed set of instructions such that the function proceeds normally. Alternatively, if the obfuscation components are integrated as part of a compiler, the system does not need to take the extra step of moving the identified instructions out of a designated instruction block. Instead the compiler can simply initially place the identified instructions directly in the designated data block.

In one variation, the system identifies data within a data block. The system can then move the identified data from the data block to an instruction block or simply place the identified data directly in the instruction block. The system can then patch references to the data block to point to the data's new location in the instruction block.

The system can also swap a set of instructions with data. In an exemplary embodiment of this aspect, the system identifies a set of instructions in an instruction block and identifies data in a data block. The identified set of instructions can be of equal or different size in comparison to the identified data. The system then relocates the identified set of instructions to the original location of the data and relocates the data to the original location of the set of instructions. If the set of instructions and the data are different sizes, the system can create a buffer for the swapped material of lesser size, which can be located directly adjacent to the swapped material or elsewhere.

The system can move multiple sets of instructions and multiple pieces of data during obfuscation. The result can be a complicated web of instructions and data found in normal and/or abnormal locations. References to data can refer to an instruction section for retrieval or to a standard data section. Moving multiple sets of instructions and data can also result in unequal placement of those sets of instructions and data. This unequal placement can result in some blocks having many pieces of program critical information, whereas other blocks may be essentially blank of necessary information. While each section retains its label as "data" or as "instructions", the accuracy and meaning of those labels is reduced because the system obfuscates at least some of the data and instructions in direct contradiction to those labels.

Another aspect of this obfuscation system during runtime can be the ability to place sets of instructions from instruction blocks into different types of data blocks. Often, within an executable, there are "Text" sections for instructions, "Data" sections for initialized data, and another data segment for uninitialized data. This data segment for uninitialized data can have varied titles, but a common title can be the "bss" or ".bss" section. While this section is often defaulted to binary values of zero, the present obfuscation system can move sets of instructions to the section and apply the corresponding patching.

Figure 2:
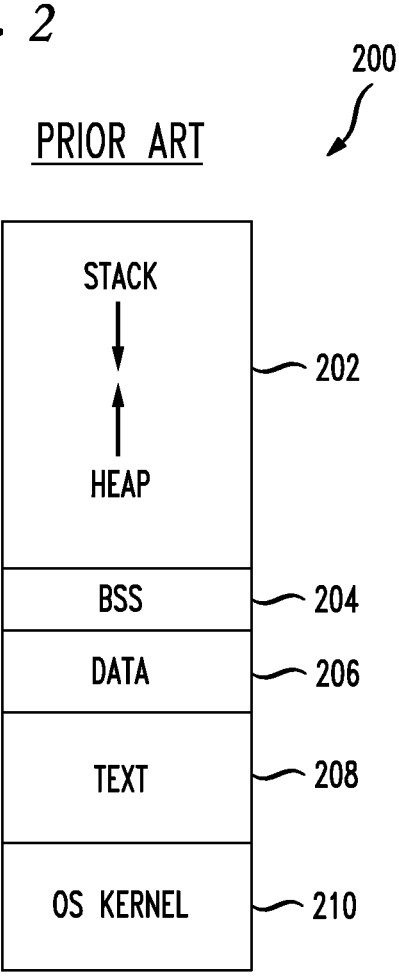
FIG. 2 illustrates an example of a data stack.

Having disclosed some aspects of obfuscation and the computing system, the disclosure now turns to FIG. 2, which illustrates an exemplary data stack 200. Here, the operating system kernel 210 has designated memory. A "Text" section 208 is a block designated for program instructions, where instructions sent to the processor are normally stored. A "Data" section 206 is a block designated for storing program variables, constants, strings, and other information utilized by the program. A "BSS" section 204 is uninitialized data, often set to a binary 0 upon program loading. These sections can have header information designating what type it is, such as "_TEXT,_text" for text sections, "_DATA,_data" for data sections, and "bss" or ".bss" for uninitialized data sections. The stack or heap 202 is used by the system 100 to dynamically allocate memory before or during runtime.

Figure 3:
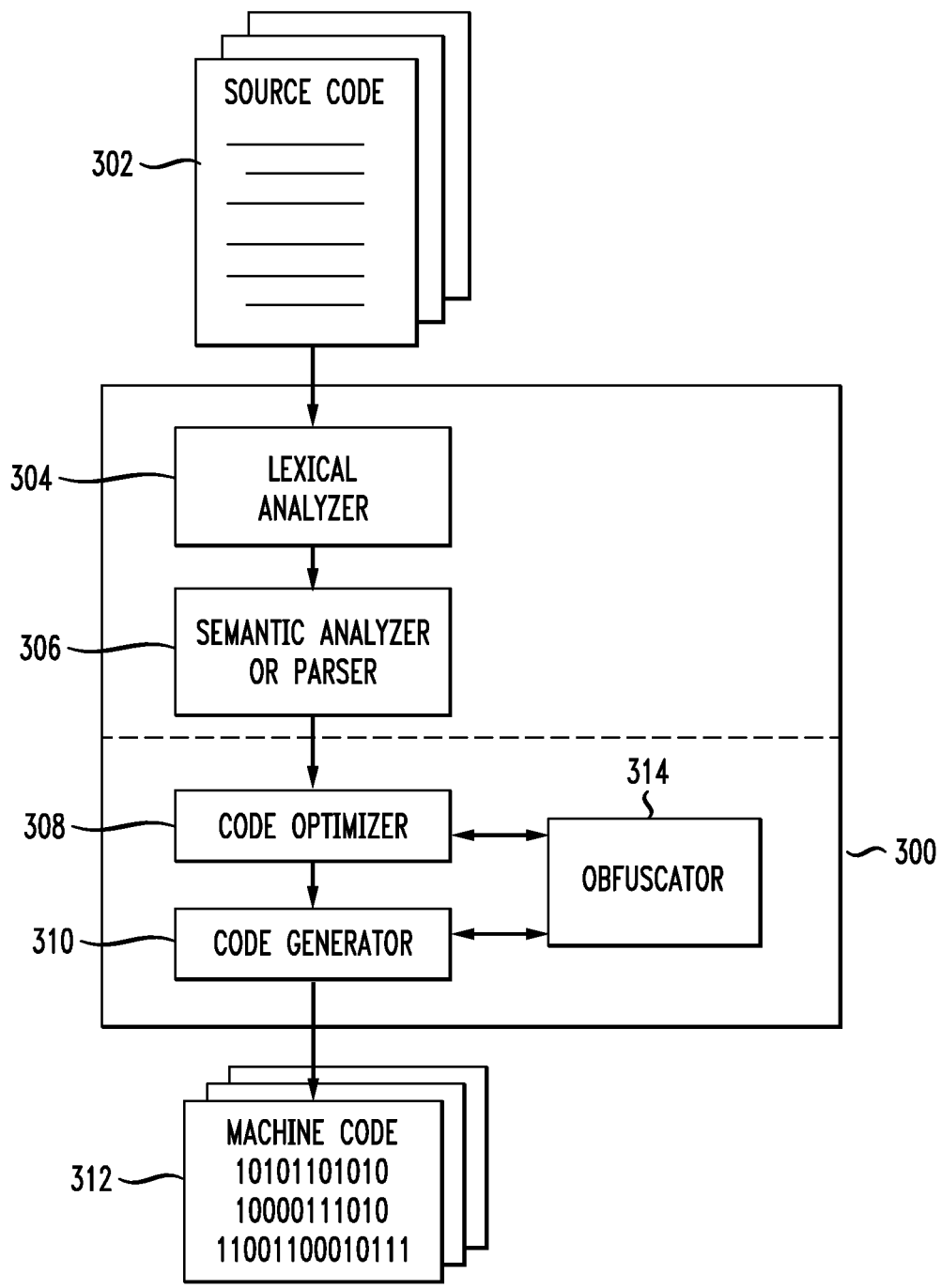
FIG. 3 illustrates an exemplary binary obfuscator implemented within the compiler.

FIG. 3 illustrates a block diagram of an exemplary compiler 300 including mechanisms for code obfuscation 314 within the compiler. A compiler 300 converts human-readable source code to object code which is understandable to and typically executable by a computing device 100. A compiler 300 is likely to perform the following representative operations as well as other operations: lexical analysis, pre-processing, parsing, semantic analysis, code optimization, and code generation. Compilers are important in the world of computer science and software because they allow programmers to write software using high level languages and convert those high level instructions to binary machine code or other object code.

The compiler 300 takes as input source code 302 for a computer program written in a programming language like Perl, Objective-C, Java, etc. The compiler 300 passes the code to the front end of the compiler 300 which includes the lexical analyzer 304 and the semantic analyzer or parser 306. The compiler 300 then operates on the source 302 in the back end, which includes the code optimizer 308 and the code generator 310. At any point in the compiler, an obfuscator 314 can process the source code or intermediate stages of the code. For example, the obfuscator 314 can communicate with the code optimizer 308 exclusively, with the code generator 310 exclusively, or as an intermediary between the code optimizer 308 and the code generator 310.

Often the division between the front end and the back end of a compiler is somewhat blurred. The compiler 300 can include other modules and can appear in different configurations. Other possible front end components include a preprocessing module and a semantic analysis module, not shown. The front end produces an intermediate representation of the code which is passed to the back end of the compiler 300. The back end of a compiler 300 can include an optimizer 308, a code generator 310, and an obfuscator 314. Finally, the code generator 310 produces machine code 312 or object code. This code 312, having gone through the obfuscator 314, will have sets of instructions and data in blocks not normally designated for the type of information found there. A linker, not shown, can combine the obfuscated output 312 from several related compiled projects into a single executable file. Other compiler components and modules can be added within the spirit and scope of this disclosure.

Figure 4:
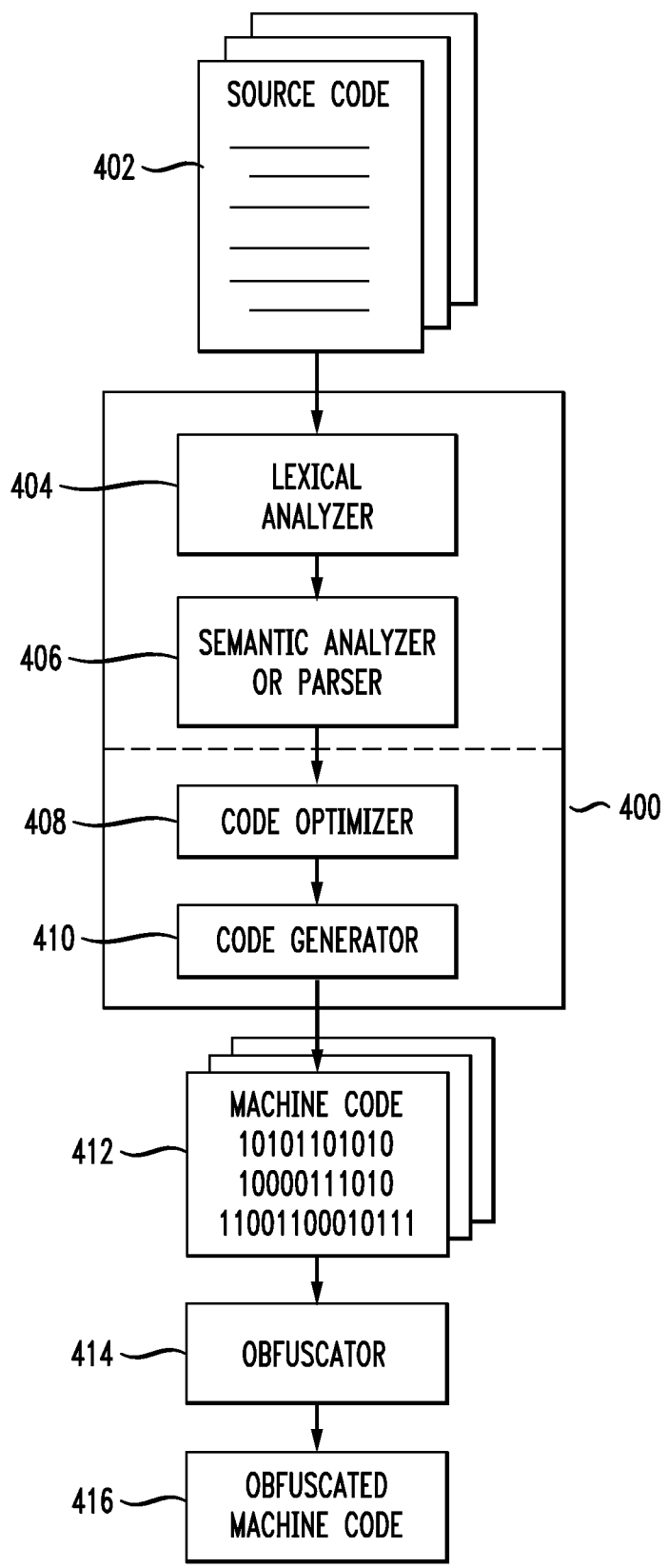
FIG. 4 illustrates an exemplary binary obfuscator implemented as a post-compiler component.

FIG. 4 illustrates a block diagram of an exemplary compiler 400 including mechanisms for code obfuscation 314 after compilation. As in FIG. 3, the compiler 400 takes as input source code 402 for a computer program written in a programming language like Perl, Objective-C, Java, etc. The compiler 400 passes the code to the front end of the compiler 400 which includes the lexical analyzer 404 and the semantic analyzer or parser 406. The compiler 400 then operates on the source 402 in the back end, which includes the code optimizer 408 and the code generator 410.

After the code generator 410 has produced the machine code 412, an obfuscator 414 obfuscates sets of instructions and data such that the normal code reading process is modified, resulting in obfuscated machine code 416. The obfuscator can be a separate tool optionally or selectively applied to the resulting machine code 412. For instance, if the obfuscator is a separate tool, then a separate command or a particular compiler flag can trigger the application of the obfuscator to the machine code 412. If a linker, not shown, is used, this obfuscation can occur prior to, during, or after the linker combines multiple machine code files into a single executable. Obfuscation can also occur during program loading into the data stack, thereby obfuscating in runtime. Other compiler components and modules can be added within the spirit and scope of this disclosure.

Figure 5:
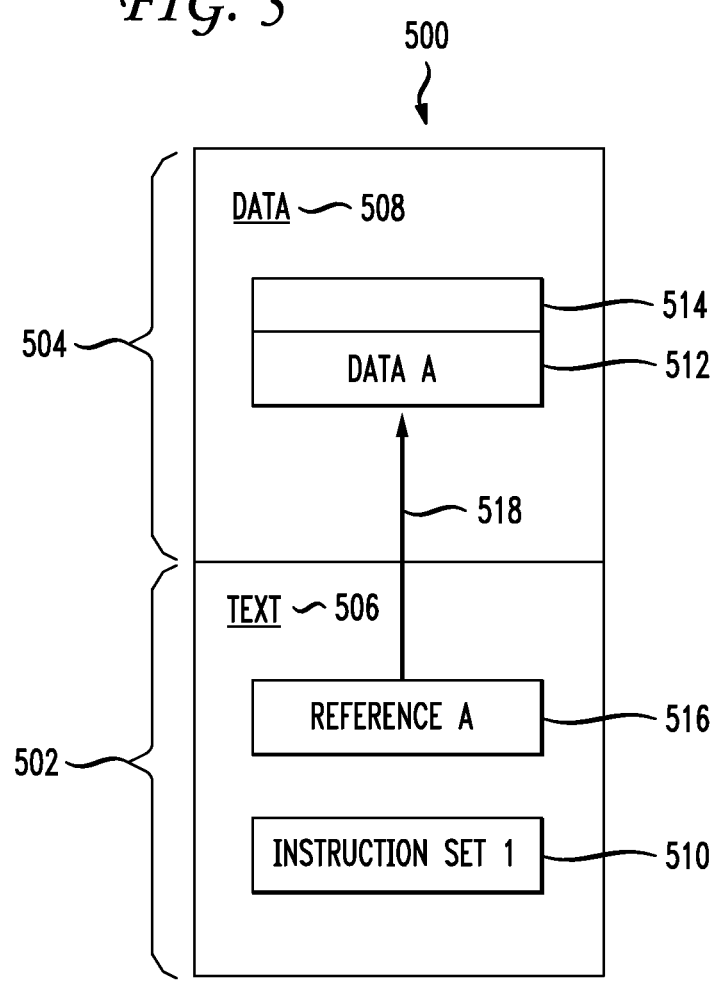
FIG. 5 illustrates an exemplary set of data and instruction blocks before obfuscation.

FIG. 5 illustrates exemplary data and instruction blocks 500 prior to obfuscation. The instruction block 502 contains a block label 506 which reads "Text." The data block 504 contains a block label 508 which reads "Data." Within the instruction block 502 a set of executable instructions 510 is located by the system 100, here identified as "Instruction Set 1." The set of executable instructions 510 can be a single instruction or multiple instructions. A second location is identified by the system 100 in the data section 504. In this example, the second location 512 also corresponds to a piece of data 512 of lesser size than the identified set of instructions 510. Thus a buffer 514 is created or identified by the system 100 corresponding to the difference in size between the data 512 and the instruction set 510. Also identified are any instructions 516 in instruction blocks which contain references 518 to the identified data 512.

Figure 6:
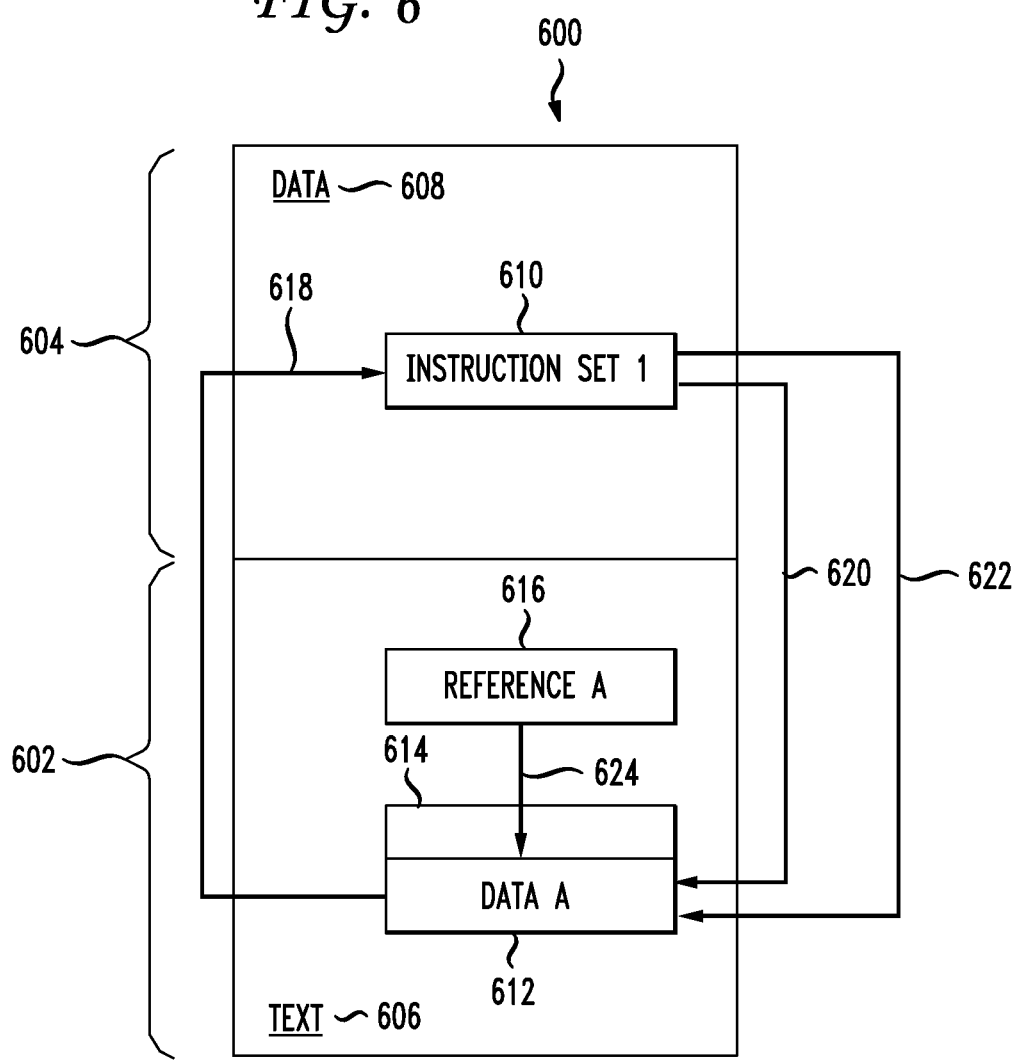
FIG. 6 illustrates the exemplary set of data and instruction blocks of FIG. 5 after obfuscation.

FIG. 6 illustrates exemplary data and instruction blocks 600 of FIG. 5 after an obfuscation operation. The instruction block 602 continues to have a block label 606 which reads "Text." The data block 604 continues to have a block label 608 which reads "Data." Now, however, the previously identified data 612 has moved from an original location in the data block 604 to the instruction block 602, as shown by an illustrative arrow 620. Similarly, the previously identified instruction set 610 has moved from an original location in the instruction block 602 to a second location in the data block 604, illustrated by an arrow 618. The reference in the instruction blocks 616 to the identified data 612 has been modified to correctly access the data 612 in its new location, illustrated by the changed reference arrow 624. In this example, the instruction set 610 is being replaced by data 612, which is not of equal size, so a buffer 614 helps fill the remaining space. To ensure proper program execution, a patch 622 is made from the end of the moved set of instructions 610 to the location in the instructions which would have been executed next had the set of instructions 610 never been moved. A similar patch, not shown, may be necessary to properly link to the moved set of instructions 610.

FIG. 7 illustrates multiple instruction and data blocks 700 before obfuscation. The instruction blocks are labeled 702 such that the system 100 can identify them as instruction blocks, here with the word "Text." Similarly, the data blocks are labeled 704 such that the system 100 can identify them as data blocks, here with the word "Data." Sets of instructions 706 are identified, as are pieces of data 708 and references in the instructions to the data 710.

FIG. 8 illustrates the multiple instruction and data blocks 800 of FIG. 7 after obfuscation. The instruction blocks 802 and data blocks 804 now have changed content, with sets of instructions 806, data 808, and instructions with references to data 810 all being moved to new locations. In this example, at least one data block 812 now has no relevant program information, or no information which was relocated. Not shown are illustrations of paths of movement made by the identified data or sets of instruction. Such an illustration would create a complicated web of movements, patches, and references.

Having disclosed some basic system components and concepts, the disclosure now turns to the exemplary method embodiment shown in FIG. 9. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps. The system identifies a set of executable instructions, in the form of compiled code or intermediate compiled code for example, at a first location in an instruction set of a computer program (902). The system then identifies a second location in a data section of the computer program (904). The system moves the identified set of executable instructions to the second location (906), and patches references in the computer program to the set of executable instructions in the first location to point to the second location (908). Likewise, the system can also move data into the instruction section.

The system can patch the references during compilation, at run time, and/or during relocation of segments. The set of instructions can include any number of instructions. The set of instructions can be as few as a single non-branching instruction, or can be many instructions followed by a single branching instruction, for example. The second location can be based on the execution architecture of a target computing device, where the execution architecture can be the cache size of the target device. For example, the system can relocate related data and instructions to be in close proximity to each other to avoid a cache miss, and the corresponding penalty hit, or to keep the related data and instructions in a same memory page. If desired, the identified executable instructions can be swapped for the data in the second location, and therefore the data of the second location will be relocated to the first location in the instruction section. If the executable instructions in the first location are the same size as the data at the second location, the system can swap the data and the executable instructions. If the instructions and the data are different sizes, the system can optionally pad one or the other or both of the locations to achieve the same size.

FIG. 10 illustrates a separate exemplary method embodiment. Again, the system identifies a set of executable instructions at a first location in an instruction section of the computer program (1002). The set of executable instructions can be a number of non-branching instructions, or can be a number of non-branching instructions followed by a branching instruction. Then the system identifies data at a second location in a data section of the computer program (1004). The system then moves the set of executable instructions identified to the second location (1006) and moves the data identified to the first location (1008). The system then patches first references to the set of executable instructions in the computer program to point to the second location and patching second references to the data in the computer program to point to the first location (1010), so that the resulting moved data and instructions, the patched references, and the remaining portions of the computer program (if any) retain functionally equivalent to the original computer program prior to the moving and patching. That is, the original program and the obfuscated program are semantically equivalent. For example, if the original computer program performed steps W, X, Y, and Z, then the modified computer program with the data and instructions moved and any corresponding references patched will also perform steps W, X, Y, and Z, even though the modified computer program performs the steps in a different way, either in a smaller, equal, or greater number of instructions or bytes. The data section can include initialized or uninitialized data, and the patching can occur either during compilation or at run time.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method of obfuscating a computer program, the method comprising:
   identifying a set of executable instructions at a first location in an instruction section of the computer program;
   identifying data at a second location in a data section of the computer program; and
   swapping the set of executable instructions at the first location with data stored at the second location, wherein at least one of the set of executable instructions at the first location and the data stored at the second location are padded to achieve a same size, and wherein the swapping comprises:
      removing the set of executable instructions from the instruction section by moving the set of executable instructions to the second location in the data section,
      identifying at least one instruction reference to an instruction in the set of executable instructions at the first location and updating the at least one instruction reference to point to the instruction in the set of executable instructions at the second location,
      removing the data from the data section by moving the data to the first location in the instruction section, and
      identifying at least one data reference to the data stored at the second location and updating the at least one data reference to point to the data stored at the first location.

2. The method of claim 1, wherein the instruction section of the computer program is labeled as _TEXT,_text.

3. The method of claim 1, wherein the data section of the computer program is labeled as _DATA,_data.

4. The method of claim 1, wherein the set of executable instructions comprises at least one non-branching instruction followed by exactly one branching instruction.

5. The method of claim 1, wherein the set of executable instructions comprises at least one non-branching instruction.

6. The method of claim 1, wherein the computer program is one of compiled code and intermediate compiled code.

7. The method of claim 1, wherein the second location is identified based on an execution architecture of a target computing device.

8. The method of claim 7, wherein the execution architecture comprises a cache size.

9. The method of claim 1, wherein updating the at least one instruction reference and the at least one data reference occurs at compile time of the computer program.

10. A system for compiling computer code, the system comprising:
    a hardware processor;
    a computer readable storage medium storing instructions for controlling the processor to perform steps comprising:
        receiving source code;
        compiling the source code to generate object code;
        identifying a set of instructions at a first location in an instruction section of the object code and identifying data at a second location in a data section of the object code; and
        swapping the set of instructions at the first location with data stored at the second location, wherein at least one of the set of executable instructions at the first location and the data stored at the second location are padded to achieve a same size, and wherein the swapping comprises:
            removing the set of executable instructions from the instruction section by moving the set of executable instructions to the second location in the data section,
            identifying at least one instruction reference to an instruction in the set of instructions at the first location and updating the at least one instruction reference to point to the instruction in the set of instructions at the second location,
            removing the data from the data section by moving the data to the first location in the instruction section, and
            identifying at least one data reference to the data stored at the second location and updating the at least one data reference to point to the data stored at the second location.

11. The system of claim 10, wherein the steps of (1) identifying a set of instructions at a first location and identifying a second location in a data section and (2) swapping the set of instructions at the first location with data stored at the second location occur iteratively to process the object code for multiple sets of instructions at different locations.

12. The system of claim 10, wherein the second location is identified based on an execution architecture of a target computing device.

13. The system of claim 12, wherein the execution architecture comprises a cache size.

14. A non-transitory computer-readable storage medium storing an obfuscated program which, when executed by a computing device, causes the computing device to perform a task, wherein the obfuscated program is generated according to steps comprising:
    identifying data at a first location in a data section of the obfuscated program;
    identifying a second location in an instruction section of the obfuscated program;
    swapping the data stored at the first location with a set of executable instructions at the second location, wherein at least one of the data stored at the first location and the set of executable instructions at the second location are padded to achieve a same size, and wherein the swapping comprises:
        removing the data from the data section by moving the data to the second location in the instruction section,
        identifying at least one data reference to the data at the first location in the data section and updating the at least one data reference to point to the data at the second location,
        removing the set of executable instructions from the instruction section by moving the set of executable instructions to the first location in the data section, and
        identifying at least one instruction reference to an instruction in the set of executable instructions at the second location and updating the at least one instruction reference to point to the instruction in the set the set of executable instructions at the first location.

15. The non-transitory computer-readable storage medium of claim 14, wherein the instruction section is labeled as _TEXT,_text, and wherein the data section is labeled as _DATA,_data.

16. A method for obfuscating a computer program, the method comprising:
    identifying a set of executable instructions at a first location in an instruction section of the computer program;
    identifying data at a second location in a data section of the computer program;
    swapping the set of executable instructions at the first location with the data stored at the second location, wherein at least one of the set of executable instructions at the first location and the data stored at the second location are padded to achieve a same size, and wherein the swapping comprises:
        removing the set of executable instructions from the instruction section by moving the set of executable instructions to the second location in the data section, and removing the data from the data section by moving the data to the first location in the instruction section, and
        identifying at least one instruction reference to an instruction in the set of executable instructions at the first location and updating the at least one instruction reference to point to the instruction in the set of executable instructions at the second location, and identifying at least one data reference to the data at the second location and updating the at least one data reference to point to the data at the first location.

17. The method of claim 16, wherein the set of executable instructions comprises any number of non-branching instructions followed by exactly one branching instruction.

18. The method of claim 16, wherein the set of executable instructions comprises at least one non-branching instruction.

19. The method of claim 16, wherein updating the at least one instruction reference and the at least one data reference occurs at compile time of the computer program.

20. The method of claim 16, wherein the data section comprises at least one of initialized data and uninitialized data.

* * * * *